United States Patent
Lin et al.

(10) Patent No.: US 6,621,955 B2
(45) Date of Patent: Sep. 16, 2003

(54) METHOD FOR FABRICATING INTEGRATED MICRO SPHERICAL LENS FOR OPTICAL FIBER SWITCH AND THE DEVICE MADE THEREFROM

(75) Inventors: Ynh-Sheng Lin, Hsinchu (TW); Yu-Hsi Chao, Chang-Hua (TW); Cheng-Tang Pan, Tainan Hsien (TW); Kun-Lung Lin, Chang-Hua Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 153 days.

(21) Appl. No.: 09/878,396

(22) Filed: Jun. 12, 2001

(65) Prior Publication Data

US 2002/0186923 A1 Dec. 12, 2002

(51) Int. Cl.⁷ .................................................. G02B 6/32
(52) U.S. Cl. .......................................................... 385/35
(58) Field of Search ...................................... 385/35, 33

(56) References Cited

U.S. PATENT DOCUMENTS

| | | | | |
|---|---|---|---|---|
| 5,124,281 A | * | 6/1992 | Ackerman et al. | 438/27 |
| 5,178,723 A | * | 1/1993 | Nguyen | 216/24 |
| 5,481,629 A | * | 1/1996 | Tabuchi | 385/14 |
| 6,477,303 B1 | * | 11/2002 | Witherspoon | 385/52 |

* cited by examiner

*Primary Examiner*—Lynn Feild
*Assistant Examiner*—Hae Moon Hyeon
(74) *Attorney, Agent, or Firm*—Birch, Stewart, Kolasch & Birch, LLP

(57) ABSTRACT

The present invention provides a fabrication process for making an integrated micro spherical lens for an optical switch. Through a semiconductor micro imaging process and a wet-etching process of micro electromechanical working, a plurality of V-shape grooves and mesas are formed on the surface of a base. A further micro imaging process, an etching process and a heat tempering process are used to form a micro spherical lens on the mesa, so that an integrated micro spherical lens and fiber array can be precisely arranged.

16 Claims, 3 Drawing Sheets

METHOD FOR FABRICATING INTEGRATED MICRO SPHERICAL LENS FOR OPTICAL FIBER SWITCH AND THE DEVICE MADE THEREFROM

BACKGROUND OF THE INVENTION

1. Field of Invention

The present invention generally relates to a process for fabricating an integrated micro spherical lens for an optical switch, and more particularly to a fabrication process utilizing photo etching and electromechanical working process to form an integrated micro spherical lens on the base of an optical fiber array, so as to construct an optical fiber collimator or optical switch.

2. Related Art

Optical communication utilizes optical fibers as transmission media. This started with a low-loss single-mode optical fiber made by Coming Glass of America in 1970. Accompanied by the development of laser diodes, optical communication has been well commercialized.

Optical communication is capable of transferring a lot of information, such as thousands of people's voices, compressed in individual time frames. Such high capacity cannot be achieved by traditional cooper wire. Moreover, optical fibers are small in size, light weight, high speed, free of noise and distortion, free from electromagnetic interference, wide-banded, and low loss, so as to fulfil the requirements of long distance and high capacity digital communication.

The optical fiber collimator or optical switch is a key component of optical fiber communication. It allows communication signals to fully transmit between fibers without any loss. Therefore, it is the main focus of development for the optical communication industry.

When a laser beam comes out of an optical fiber, the sectional diameter of the beam becomes larger as the distance of its path increases. If the diameter of the beam exceeds the module field diameter (MFD) of the succeeding optical fiber, optical loss will occur. Minor loss will weaken the signal, while major loss will cause communication to fail.

In order to prevent optical loss in the coupling device, a spherical lens has been applied to convert light emitted from a light emitting device, or the emergent end of an optical fiber into a parallel beam of light, or the reverse, to focus a parallel beam of light on a light detecting device or the incident end of an optical fiber. Such an optical part is referred to as a fiber collimator. Fiber collimators are frequently used, for example, in an optical switch for changing over a light path. Optical switches are widely used as basic optical devices, and optical devices that are reliable and suitable for miniaturization are in great demand. The miniaturized spherical lens is developed so as to be light-weight, small in size and cheap, while remaining functional. Currently, a small spherical lens or cylindrical lens with a diameter around 200 to 300 microns can be made. The spherical lens is only half of the diameter of a human hair, so it is difficult for an automatic device to handle it. Therefore, it can only be processed manually. The operator has to precisely position the lens in alignment with the light path, and glue and fasten it when a good coupling signal is obtained. When aligning a lens array, two or more alignment points have to be taken care of, and when one point has been positioned, it can easily lose its position when another point is being adjusted. Thus, repeated operations are needed for assembling the spherical lens in the optical switch, and high cost is inevitable.

Though a conventional spherical lens can be placed in the light path of an optical switch for improving optical coupling, the cost of the lens is high, the operation requires manual handling, and the quality and production rate cannot be improved. Thus, it cannot satisfy the requirements of the increasing market.

SUMMARY OF THE INVENTION

Accordingly, it is an object of the present invention to provide a method for fabricating a micro spherical lens for an optical switch, which overcomes such drawbacks of the prior art, as described above.

It is another object of the present invention to provide a method for fabricating an integrated micro spherical lens for an optical switch, which can be mass-produced. It utilizes photo etching and electromechanical working process to form an integrated micro spherical lens on the base of an optical fiber array, so as to construct an optical fiber collimator or optical switch in a low cost and high precision manner.

It is yet another object of the present invention to provide an optical switch having at least an integrated micro spherical lens made from semiconductor fabrication processes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed descriptions given herein. The descriptions provided below are for illustration only, and thus are not limitative of the present invention, wherein.

DETAILED DESCRIPTION OF THE INVENTION

The present invention provides a fabrication process for making an integrated micro spherical lens for an optical switch. The fabrication method includes two semiconductor processes. The first process is defined as including a semiconductor micro imaging process and a wet-etching process of a micro electromechanical working process. The second process is defined as including a micro imaging process and an etching process.

The present invention first applies an optical mask to a semiconductor base, and applies the first process to finish the base 1100 of an optical fiber array. A plurality of V-shape grooves 1101 and a plurality of mesas 1102 having narrower tops and wider bottoms are formed on the surface of the base 1100. The optical fiber array is placed in the V-shape grooves

1101. The mesas 1102 are formed on the ends of the V-shape grooves 1101 for placing the integrated micro spherical lens array. The pattern on the optical mask and the first process will determine the distance between a V-shape groove 1101 and a mesa 1102, so that when the optical fiber array is placed on the V-shape groove 1101, the lower rim of one end of an optical fiber will make contact with the lower portion of a mesa 1102, then the optical fiber is well positioned without need for further adjustment. Therefore, it prevents the bothersome and difficult adjustment of conventional devices, for which no suitable stopper is provided for placing an optical fiber in a V-shape groove.

Figure 1A:
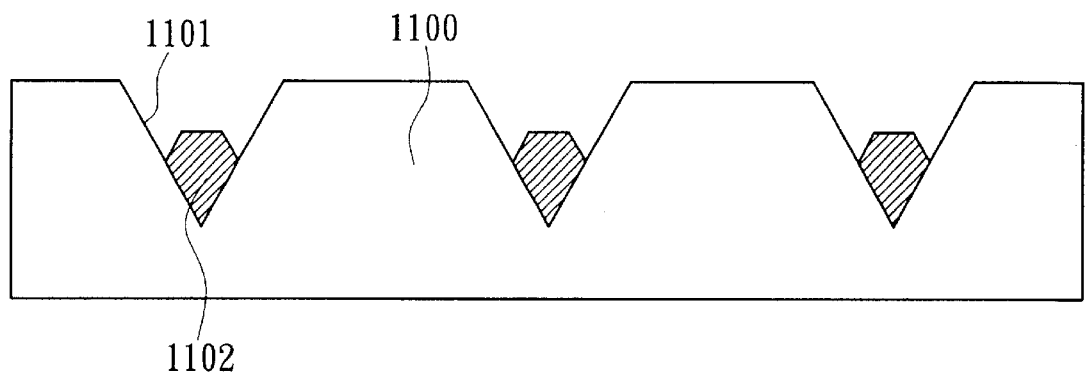
FIGS. 1A through 1E are sequential illustrations showing the process of fabricating an integrated micro spherical lens on a base according to the present invention.
Figure 1B:
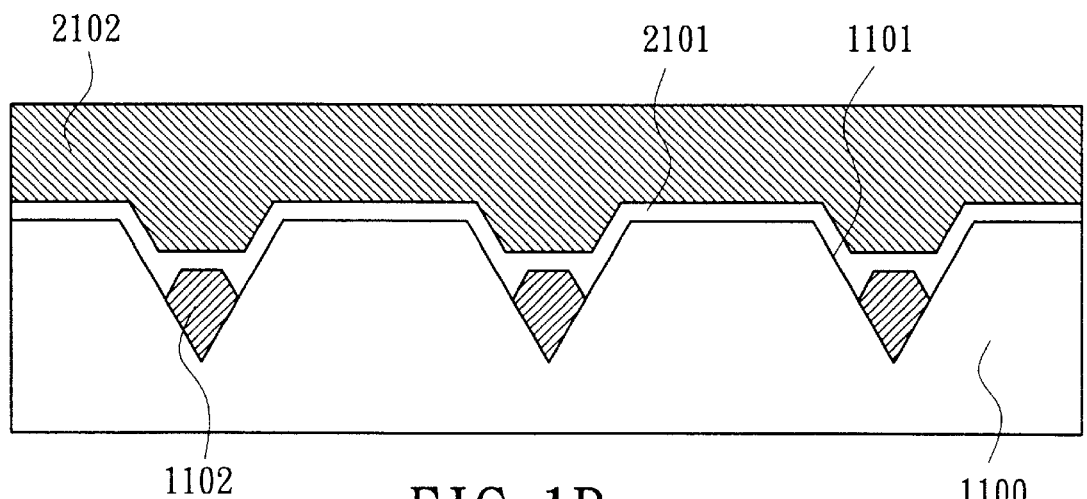
Figure 1C:
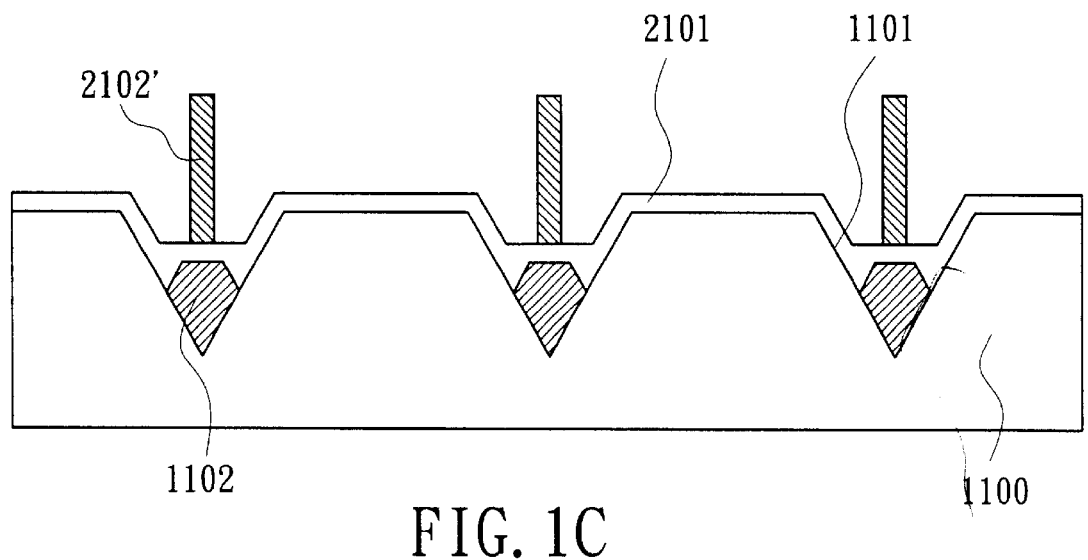

Then, in the second process, a semiconductor micro imaging process and an etching process are used to finish an optical switch having an integrated micro spherical lens. The process includes the steps shown in FIGS. 1A through 1E. In FIG. 1A, a first process is applied to finish the base 1100 of an optical fiber array with a plurality of V-shape grooves 1101 and a plurality of mesas 1102. In FIG. 1B, a lens carrying layer 2101 and a light blocking layer 2102 with thick membranes are further formed on the base 1100 of an optical fiber array. By a second mask and a semiconductor micro imaging process, a further light blocking layer is defined as a mask for etching, then a light blocking layer 2102, as shown in FIG. 1C, is formed. Since these processes comply with fabrication techniques for integrated circuit and electromechanical working process, which are high resolution, the positions of the first and second masks are only limited by the resolution of the semiconductor micro imaging process. Therefore, the light blocking layer 2102' will be well positioned with the mesas 1102 of the base 1100.

Figure 1D:
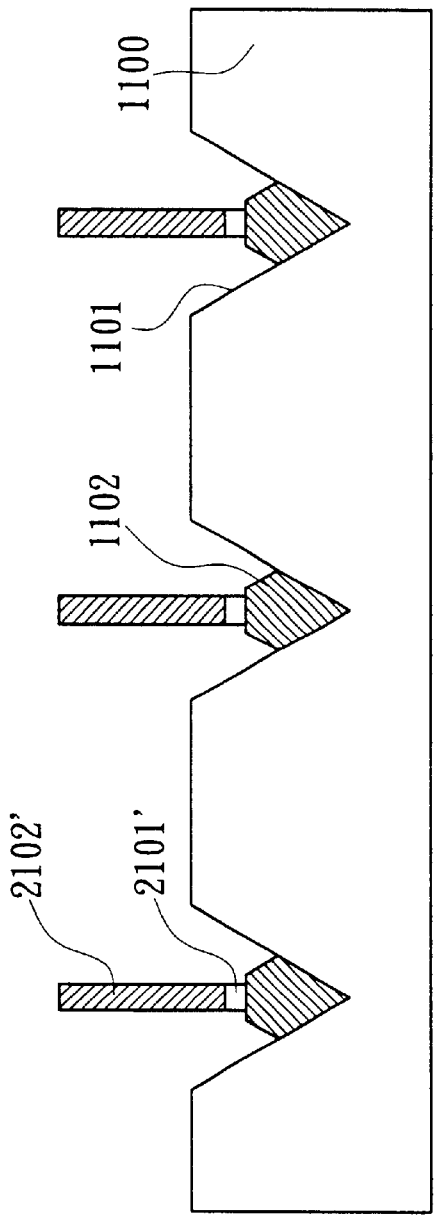
Figure 1E:
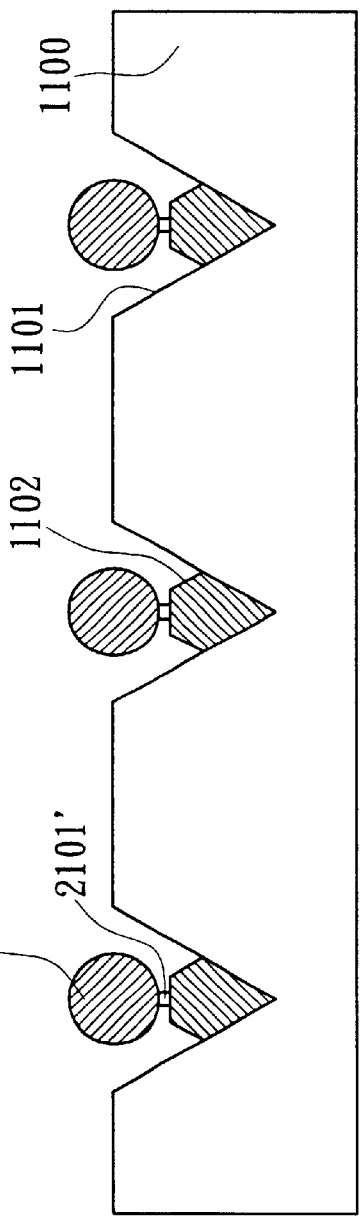

In FIG. 1D, the outward area of the lens carrying layer 2101, besides that under the light blocking layer 2102', is removed through etching. Then, small columns of the lens carrying layer 2101' are obtained. Finally, the lens carrying layer 2101', with the light blocking layer 2102', is tempered under a suitable temperature by which the lens carrying layer 2101' shrinks (since the layers are polymer), and the light blocking layer 2102' shrinks into a micro spherical lens 2103, as shown in FIG. 1E. Thus, an optical fiber array base with a micro spherical lens is made. Thus, an optical fiber array base with a micro spherical lens is made. The optical fiber array base can be defined as a base of an integrated micro spherical lens array and applied to an optical switch.

Since the base of the integrated micro spherical lens array is made with two semiconductor processes in which two optical masks, micro imaging and etching process, are used, single or multiple areas for forming the micro spherical lens 2103 can be defined when defining the masks. Therefore, the micro spherical lens 2103 formed on the mesa 1102 can be precisely positioned on the base 1100 of the optical fiber array. When placing optical fibers in the V-shape grooves, the optical fibers can then align with the micro spherical lens 2103 and obtain good laser beam transmission without any further adjustments.

Figure 2:
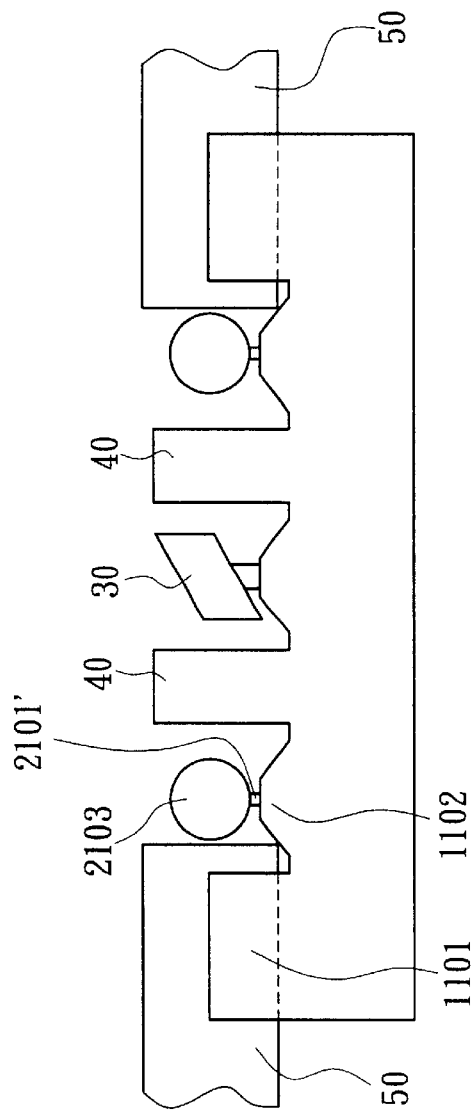
FIG. 2 is a first embodiment of a finished lens array of the present invention.

FIG. 2 is a first embodiment of a finished lens array of the present invention applied to an optical switch. A plurality of wave guides 40 are also formed on the base of an integrated micro spherical lens array, and are opposed to the V-shape grooves 1101 and mesas 1102. Also, an optical switch device 30 is mounted for switching the path of the laser beam. The focused laser beam will be guided by the wave-guide 40 before being transmitted to the switch device 30 and the succeeding optical fiber array 50. The optical switch device 30 can be chosen from at least one of the following types: torsion mirror, moving mirror, thermal bubble and magnetic flow.

Figure 3:
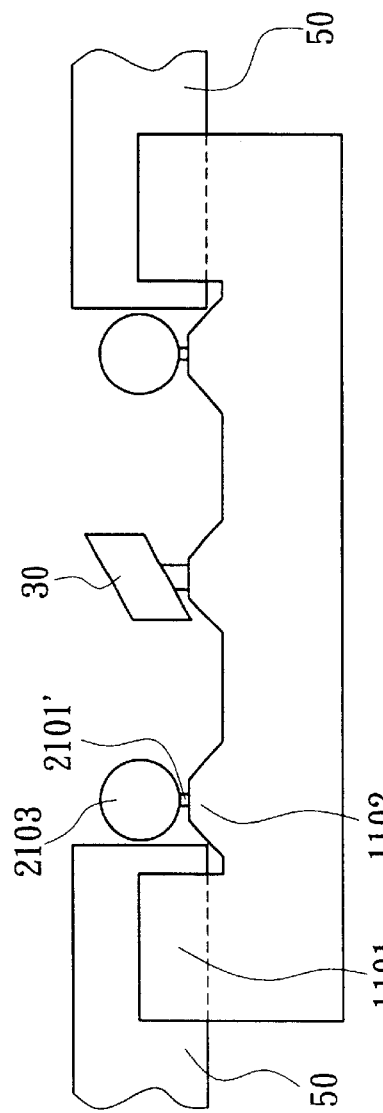
FIG. 3 is a second embodiment of a finished lens array of the present invention.

FIG. 3 is a second embodiment of a finished lens array of the present invention applied to an optical switch. A switch device 30 is mounted on the base of an integrated micro spherical lens array for switching the path of the laser beam. The focused laser beam will pass through the air before transmitting the switch device 30 and the succeeding optical fiber array 50.

In conclusion, the fabrication process for an integrated micro spherical lens for an optical switch according to the present invention can complete a single spherical lens or multiple spherical lenses on the base of an optical fiber array. Thus, optical fibers and spherical lenses can be directly aligned without need for manual adjustment. The assembly cost is therefore reduced, and the quality is improved.

Presently, a single micro spherical lens fabricated according to the present invention costs only 0.03 US dollars, and the diameter of the lens is as small as 50 microns. The price of many conventional spherical lenses exceeds 500 US dollars, and their diameter often exceeds 200 microns. The novelty and advantages of the present invention are therefore evident.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fabrication process for making an integrated micro spherical lens for an optical switch comprising steps of:
   a) providing a base of optical fiber array having at least a V-shape groove and a mesa;
   b) forming a lens carrying layer and a light blocking layer with thick membrane on said base of step a);
   c) defining by micro imaging and etching a mask on said light blocking layer for etching;
   d) removing through etching an outward area of lens carrying layer besides said mask, so as to obtain at least a small column of said light blocking layer and lens carrying layer; and
   e) tempering said small column of a light blocking layer and lens carrying layer under suitable temperature to shrink said lens-carrying layer, and shrink said light blocking layer into micro spherical lens.

2. The fabrication process for making an integrated micro spherical lens for an optical switch according to claim 1 wherein said mesa in step a) is a stopper for limiting position of optical fiber when being placed in said V-shape groove.

3. The fabrication process for making an integrated micro spherical lens for an optical switch according to claim 1 wherein said mask in step c) defines an area for forming at least a micro spherical lens array.

4. The fabrication process for making an integrated micro spherical lens for an optical switch according to claim 1 wherein said base of optical fiber array further comprises at least a wave guide opposed to said V-shape groove and said mesa.

5. The fabrication process for making an integrated micro spherical lens for an optical switch according to claim 1 wherein said base of optical fiber array further comprises at least an optical switch device.

6. An optical switch made by semiconductor fabrication processes, comprising:
   at least a micro spherical lens made by photo etching and two-layer polymer heat tempering process of a light blocking layer;

a base for optical fiber array on which a plurality of V-shape grooves is formed for placing optical fibers; and said spherical lens being supported by said base in one of said grooves.

7. The optical switch made by semiconductor fabrication processes according to claim 6 further comprises at least a mesa in one of said grooves for supporting said micro spherical lens.

8. The optical switch made by semiconductor fabrication processes according to claim 7 wherein said mesa is a stopper for positioning an optical fiber when being placed in said V-shape groove.

9. The optical switch made by semiconductor fabrication processes according to claims 6 wherein a plurality of micro spherical lens form a micro spherical lens array.

10. The optical switch made by semiconductor fabrication processes according to claim 9 further comprises a plurality of mesas in said grooves for supporting said micro spherical lens array.

11. The optical switch made by semiconductor fabrication processes according to claim 6 wherein said base for optical fiber array further comprises at least a wave guide for guiding the light path.

12. The optical switch made by semiconductor fabrication processes according to claim 6 wherein said base for optical fiber array further comprises at least an optical light path switch device.

13. The optical switch made by semiconductor fabrication processes according to claim 12 wherein said optical switch device is a torsion mirror.

14. The optical switch made by semiconductor fabrication processes according to claim 12 wherein said optical switch device is a moving mirror.

15. The optical switch made by semiconductor fabrication processes according to claim 12 wherein said optical switch device is a thermal bubble and magnetic flow.

16. The optical switch made by semiconductor fabrication processes according to claim 12 wherein said optical switch device is a magnetic flow.

* * * * *